United States Patent
Adkins (10) Patent No.: US 10,850,322 B2
(45) Date of Patent: Dec. 1, 2020

(54) CASTING STAND CONTROL SYSTEM WITH RADIUS ROLL FEEDBACK AND METHOD OF USE

(71) Applicant: NUCOR CORPORATION, Charlotte, NC (US)

(72) Inventor: Rodney Ray Adkins, Ridgely, TN (US)

(73) Assignee: NUCOR CORPORATION, Charlotte, NC (US)

( * ) Notice: Subject to any disclaimer, the term of this patent is extended or adjusted under 35 U.S.C. 154(b) by 46 days.

(21) Appl. No.: 16/175,383

(22) Filed: Oct. 30, 2018

(65) Prior Publication Data

US 2019/0126343 A1 May 2, 2019

Related U.S. Application Data

(60) Provisional application No. 62/578,649, filed on Oct. 30, 2017.

(51) Int. Cl.
  *B22D 11/16* (2006.01)
  *G05B 6/02* (2006.01)
  *B22D 11/20* (2006.01)

(52) U.S. Cl.
  CPC .............. *B22D 11/16* (2013.01); *B22D 11/20* (2013.01); *G05B 6/02* (2013.01)

(58) Field of Classification Search
  CPC .. D22D 11/16; B22D 11/0622; B22D 11/168; B22D 11/16; B22D 11/20; B05B 15/40; B05C 5/0245; B05C 5/0254; B05C 5/027; B33Y 80/00; B01D 37/00; G05B 6/02
  See application file for complete search history.

(56) References Cited

U.S. PATENT DOCUMENTS

| 3,344,841 | A | | 10/1967 | Rys et al. |
| 4,030,326 | A | * | 6/1977 | Morooka ............... B21B 37/165 72/9.4 |
| 5,018,569 | A | | 5/1991 | Burau et al. |
| 5,479,982 | A | * | 1/1996 | Hoffken .................. B21B 1/463 164/154.2 |

(Continued)

OTHER PUBLICATIONS

Passenbrunneret al., Mold level control of a continuous casting plant by switching control strategies, Sep. 2010, Institute for Design and Control of Mechatronical Systems, pp. 1350-1355. (Year: 2010).*

*Primary Examiner* — Kidest Bahta
(74) *Attorney, Agent, or Firm* — Moore & Van Allen PLLC; Jeffrey R. Gray (57) ABSTRACT

Feedback is captured and monitored from a radius roll, an upstream rolling unit, and a downstream rolling unit within a casting stand in order to control steel strand casting. The stability of the radius roll is determined, and in response the load share between the downstream unit and the upstream unit is adjusted. When the stability of the radius roll has not changed for a period of time, it may indicate that the steel strand is sagging, and in response the load share of the downstream unit versus the upstream unit is increased. Alternatively, when the stability of the radius roll becomes unstable, such as when the speed of the radius roll is changing, decreasing, or is less than a casting speed, the steel strand may be lifting off of the radius roll, and in response the load share of the downstream unit versus the upstream unit is decreased.

20 Claims, 5 Drawing Sheets

(56) References Cited

U.S. PATENT DOCUMENTS

| | | | | |
|---|---|---|---|---|
| 5,592,987 A | * | 1/1997 | Romanowski | B22D 11/0622 |
| | | | | 164/428 |
| 5,774,973 A | * | 7/1998 | Aoyama | B21B 1/466 |
| | | | | 29/526.2 |
| 6,155,331 A | * | 12/2000 | Langer | B22C 1/00 |
| | | | | 164/456 |
| 6,427,758 B1 | | 8/2002 | Klassen | |
| 7,155,951 B2 | * | 1/2007 | Farley | B21B 37/007 |
| | | | | 72/205 |
| 2002/0162377 A1 | * | 11/2002 | Sclippa | B21B 1/18 |
| | | | | 72/235 |
| 2009/0090484 A1 | * | 4/2009 | d'Hone | B22D 11/066 |
| | | | | 164/463 |

* cited by examiner

CASTING STAND CONTROL SYSTEM WITH RADIUS ROLL FEEDBACK AND METHOD OF USE

CROSS REFERENCE AND PRIORITY CLAIM UNDER 35 U.S.C. § 119

The present application for a patent claims priority to U.S. Provisional Patent Application Ser. No. 62/578,649 entitled "CASTING STAND CONTROL SYSTEM WITH RADIUS ROLL FEEDBACK AND METHOD OF USE" filed on Oct. 30, 2017 and assigned to the assignees hereof and hereby expressly incorporated by reference herein.

FIELD

This application relates generally to the field of steelmaking, and more particularly to strand casting and equipment therefor.

BACKGROUND

Due to the harsh environments in which steel is produced it is difficult to monitor and adjust the casting of steel as the steel strand is being cast. During the casting process the steel strand being cast is subject to strains as the various rollers move the steel strand from the casting mold, to the pinch rollers, and to the withdrawing and straightening rollers of the casting process. These strains on the cast strand negatively affect the properties of the end products made from the steel strand.

BRIEF SUMMARY

The present disclosure provides systems, methods, and computer program products that result in improvements in the casting process by reducing the strains on the steel strand that occur during the bending and unbending phase of the casting process. In particular, the present disclosure utilizes feedback captured and monitored from a radius unit (e.g., including a radius roll), an upstream unit located upstream from the radius roll, and a downstream unit located downstream of the radius roll in order to control the casting process. In one embodiment of the present disclosure, the stability of the radius roll is determined, and in response the load share between the downstream unit and the upstream unit is adjusted. More specifically, when the present disclosure determines that the stability of the radius roll has not changed for a period of time, it may indicate that the steel strand is sagging, and in response the load share of the downstream unit compared to the upstream unit is increased. Alternatively, when the stability of the radius roll becomes unstable, such as when the speed is changing, or when the speed of the radius roll decreases or is less than the casting speed, the strand may be lifting off of the radius roll, and in response the load share of the downstream unit compared to the upstream unit is decreased. Increasing the load share between the downstream unit and the upstream unit may occur by increasing the load of the downstream unit and/or decreasing the load of the upstream unit. Alternatively, decreasing the load share between the downstream unit and the upstream unit may occur by decreasing the load of the downstream unit and/or increasing the load of the upstream unit. Changing load share of the downstream unit and/or the upstream unit may occur by changing the current supplied to the downstream motor(s) and/or the upstream motor(s) associated with the downstream rollers and/or upstream rollers.

One embodiment of the invention comprises a method of controlling a casting process. The method comprises receiving feedback from a radius unit within a casting stand, monitoring the feedback from the radius unit, and adjusting an upstream unit or a downstream unit based on the monitoring of the feedback received from the radius unit.

In further accord with embodiments of the invention, receiving the feedback from the radius unit comprises receiving an indicator of movement of a radius roll of the radius unit, and wherein the monitoring of the feedback from the radius roll comprises identifying stability of the radius roll.

In other embodiments of the invention, the stability is a change in speed of the radius roll for a time period.

In still other embodiments, the method further comprises identifying that the stability of the radius roll remains unchanged for a time period, and wherein adjusting the upstream unit or the downstream unit comprises increasing a load share of the downstream unit compared to the upstream unit.

In yet other embodiments of the invention, increasing the load share comprises increasing a downstream current to a downstream motor of the downstream unit or decreasing an upstream current to an upstream motor of the upstream unit.

In further accord with embodiments, the method further comprises identifying that the stability of the radius roll changes for a time period or a speed of the radius roll is less than a casting speed, and wherein adjusting the upstream unit or the downstream unit comprises decreasing a load share of the downstream unit compared to the upstream unit.

In other embodiments of the invention, decreasing the load share comprises decreasing a downstream current to a downstream motor of the downstream unit or increasing an upstream current to an upstream motor of the upstream unit.

In still other embodiments of the invention, the feedback received from the radius unit is received through a movement sensor operatively coupled to a radius roll of the radius unit that measures a movement of the radius roll.

In yet other embodiments of the invention, the receiving, the monitoring, and the adjusting occur through a control system. The control system comprises one or more memory devices having computer readable program code store thereon, and one or more processing devices operatively coupled to the one or more memory devices, wherein the one or more processing devices are configured to execute the computer readable program code to perform the receiving, the monitoring, and the adjusting.

Another embodiment of the invention comprises a control system for a casting stand. The control system comprises one or more memory devices having computer readable program code stored thereon, and one or more processing devices operatively coupled to the one or more memory devices, wherein the one or more processing devices are configured to execute the computer readable program code to receive feedback from a radius unit within the casting stand, monitor the feedback from the radius unit, and adjust an upstream unit or a downstream unit based on the monitoring of the feedback received from the radius unit.

In further accord with embodiments of the invention, receiving the feedback from the radius unit comprises receiving an indicator of movement of a radius roll of the radius unit, and wherein monitoring the feedback from the radius roll comprises identifying stability of the radius roll.

In other embodiments of the invention, the stability is a change in speed of the radius roll for a time period.

In yet other embodiments, the one or more processing devices are further configured to execute the computer readable program code to identify that the stability of the radius roll remains unchanged for a time period, and wherein adjusting the upstream unit or the downstream unit comprises increasing a load share of the downstream unit compared to the upstream unit.

In still other embodiments of the invention, increasing the load share comprises increasing a downstream current to a downstream motor of the downstream unit or decreasing an upstream current to an upstream motor of the upstream unit.

In further accord with embodiments of the invention, the one or more processing devices are further configured to execute the computer readable program code to identify that the stability of the radius roll changes for a time period or the speed of the radius roll is less than a casting speed, and wherein adjusting the upstream unit or the downstream unit comprises decreasing a load share of the downstream unit compared to the upstream unit.

In other embodiments of the invention, decreasing the load share comprises decreasing a current to a downstream motor of the downstream unit or increasing a current to an upstream motor of the upstream unit.

In still other embodiments of the invention, the feedback received from the radius unit is received through a movement sensor operatively coupled to a radius roll of the radius unit that measures a movement of the radius roll.

Another embodiment of the invention comprises casting system. The system comprises an upstream unit, a downstream unit, a radius unit comprising a movement sensor, and a control system operatively coupled to the upstream unit, the downstream unit, and the radius unit. The control system receives feedback from the movement sensor of the radius unit, monitors the feedback from the radius unit, and adjusts the upstream unit or the downstream unit based on the monitoring of the feedback received from the radius unit.

In further accord with embodiments of the invention, receiving the feedback from the radius unit comprises receiving an indicator of movement of a radius roll of the radius unit, wherein monitoring the feedback from the radius roll comprises identifying stability of the radius roll, and wherein the stability is a change in speed of the radius roll for a time period, and wherein adjusting the upstream unit or the downstream unit comprises increasing a load share of the downstream unit compared to the upstream unit when identifying that the stability of the radius roll remains unchanged for the time period.

In other embodiments of the invention, increasing the load share comprises increasing a downstream current to a downstream motor of the downstream unit or decreasing an upstream current to an upstream motor of the upstream unit.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein.

DETAILED DESCRIPTION

Embodiments of the present disclosure now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1:
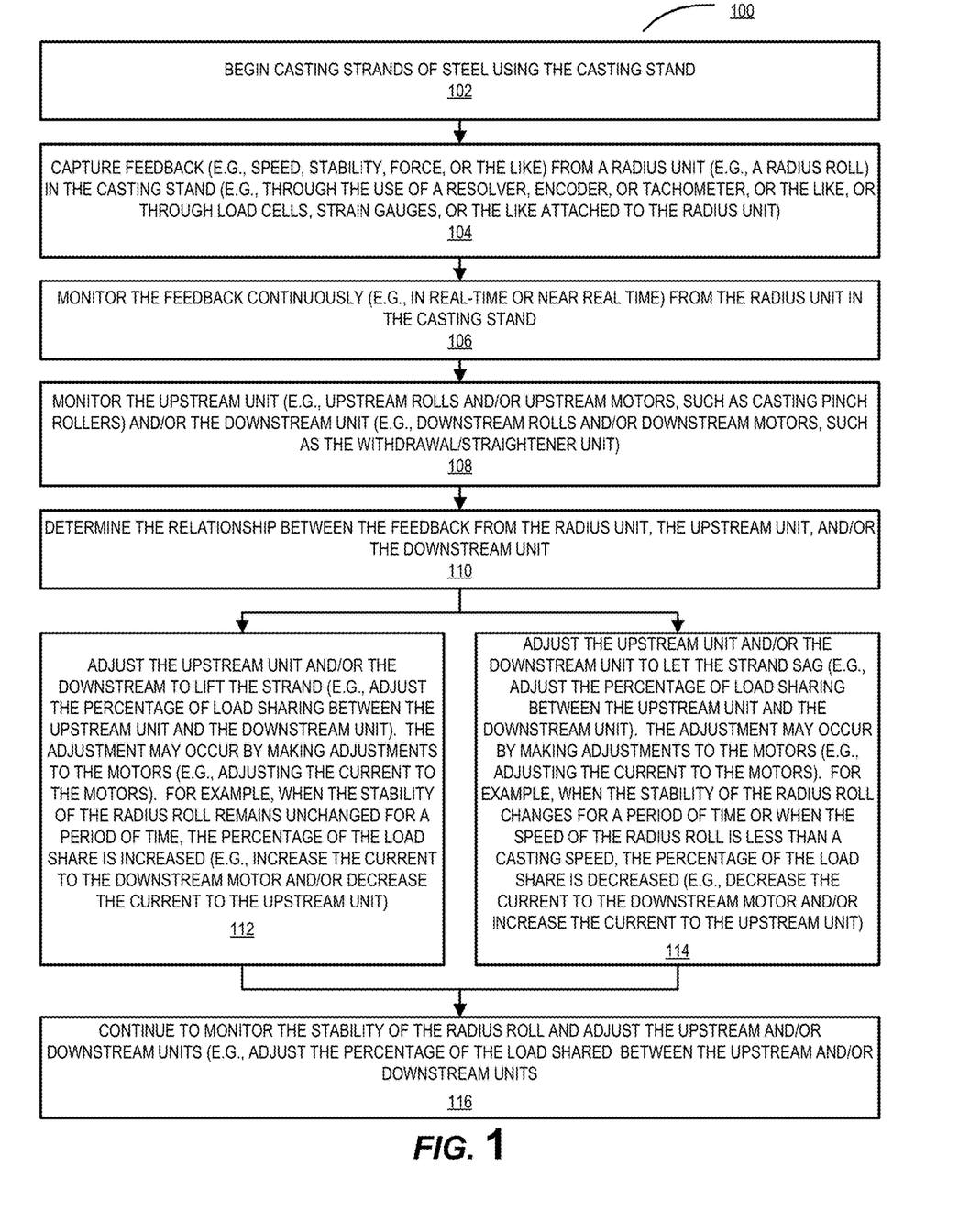
FIG. 1 illustrates a process flow for controlling a casting process utilizing feedback from a radius unit to control upstream and downstream rolling units, in accordance with embodiments of the present disclosure.

The present disclosure relates to a control system, a computer program product for the control system, and a method of using the control system to cast steel strands during a steel making process. FIG. 1 illustrates a casting process 100 that utilizes a control system to manufacture steel, and in particular utilizes feedback from the casting stand 200 (otherwise described as a casting system) in order to control the casting process 100. As will be described with respect to FIG. 1, in some embodiments the control system utilizes feedback from a radius unit 210 (e.g., radius roll, or the like) to control one or more upstream units 230 (e.g., with one or more upstream rollers and/or motors) and/or one or more downstream units 250 (e.g., with one or more downstream rollers and/or motors). As illustrated by block 102 in FIG. 1, the casting process begins by casting molten metal into a steel strand. For example, molten steel from a ladle and/or tundish (e.g., located below a ladle) are transferred (e.g., through gravity and an entry nozzle, or the like) to a mold 202. The mold 202 is typically water cooled, and thus, begins to form and cool the molten steel into a steel strand.

Figure 2:
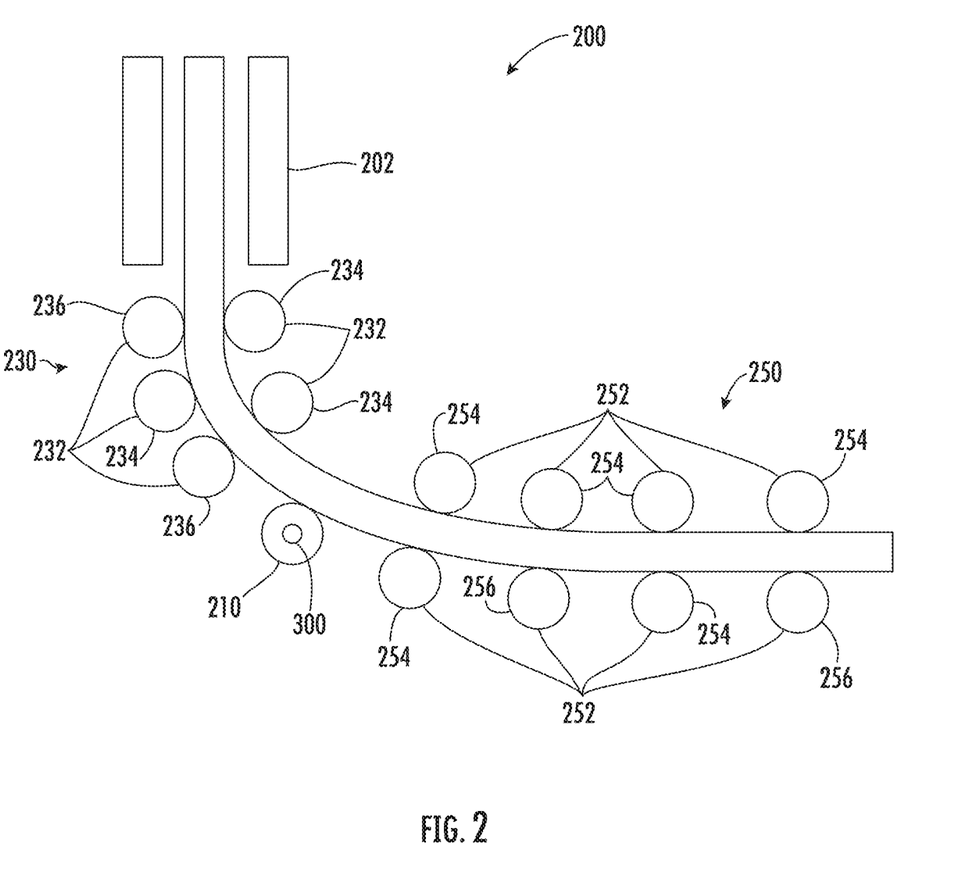
FIG. 2 illustrates a casting stand with a radius unit, and upstream and downstream rolling units, in accordance with embodiments of the present disclosure.

In a bending casting stand, as illustrated in FIG. 2, one or more upstream units 230 (e.g., two or more upstream rollers and/or one or more upstream motors) receive the steel strand exiting the mold 202, move the steel strand in the vertical direction, and bend the steel strand in the desired location. The one or more downstream units 250 (e.g., two or more downstream rollers and/or one or more upstream motors) then bend and straighten the steel strand to the horizontal direction using one or more downstream units 250. The one or more upstream units 230 may have roller pairs and/or individual rollers that pull and/or guide the steel strand away from the mold. The one or more upstream units 230 may have rollers 232 that are freely moving rollers 234 and/or driven rollers 236 (e.g., through the use of a motor). In some embodiments of the invention a motor turns a single driven upstream roller 236 and one or more freely moving rollers 234 are positioned on an opposite side of the steel strand. In other embodiments of the invention one or more motors drive two or more upstream rollers 236. The one or more upstream units 230 help to bend the steel strand from the vertical direction towards a horizontal direction.

It should be further understood that one or more radius units 210 are also used to help guide the steel strand from a vertical orientation to a horizontal orientation. The one or more radius units 210 generally comprise a freely moving roller 212 and a movement sensor 300, which will be described in further detail later. The radius roller 212 helps to guide the steel strand to one or more downstream units 250.

The one or more downstream units 250 help bend the steel strand from the vertical direction to the horizontal direction until the steel strand is located in the horizontal direction. The one or more downstream units 250, like the one or more upstream units 230, may have roller pairs and/or individual rollers that pull and/or guide the steel strand. The one or more downstream units 250 may have rollers 252 that are freely moving rollers 254 and/or driven rollers 256 (e.g., through the use of one or more motors). In some embodiments of the invention a motor 258 turns a single driven downstream roller 256 and one or more freely moving rollers 254 are positioned on an opposite side of the steel strand. In other embodiments of the invention one or more motors 258 drive two or more downstream rollers 256. The one or more downstream units 250 help to receive the steel strand and straighten the steel strand into the horizontal direction.

It should be understood that the one or more freely moving rollers (e.g., the one or more freely moving upstream rollers 234 and/or the one or more freely moving downstream rollers 256), as well as the one or more driven rollers (e.g., the one or more upstream driven rollers 236 and/or one or more downstream driven rollers 256) may be located on either side of the steel strand (e.g., a first side or a second side), regardless of how they are illustrated in FIG. 2. Due to the bending of the steel strand from the vertical orientation exiting the mold 202 to the horizontal orientation, stresses are exerted onto the steel strand (e.g., compression on one side and tension on the opposing side of the steel strand). Moreover, it should be further understood that should the casting speed vary from exiting the molds at the upstream units 230 to the downstream units 250 additional stresses may be exerted on the steel strand. The changes in speed of the one or more upstream units 230 and the one or more downstream units 250 may vary due at least in part to wear and heat related size changes of the rollers. In addition, the shrinkage rate of the actual steel strand can vary due to the different alloys present in various grades of steel. As such, each casting of a steel strand may result in different stresses that are exerted on the steel strand.

Figure 3A:
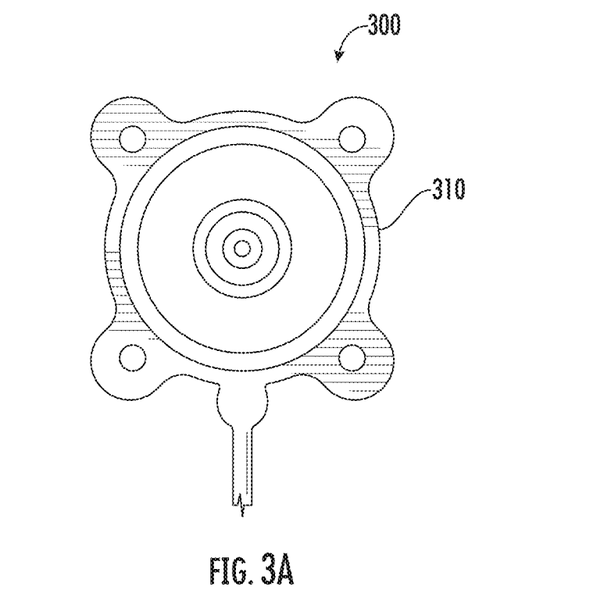
FIG. 3A illustrates an end view of one embodiment of a movement sensor, and in particular a resolver, used to detect the stability of the radius roll, in accordance with embodiments of the present disclosure.
Figure 3B:
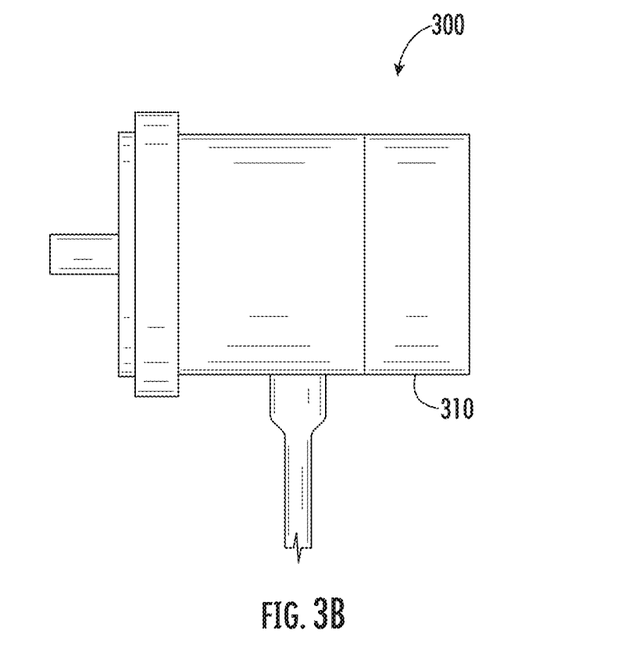
FIG. 3B illustrates a side view of one embodiment of the movement sensor, and in particular a resolver of FIG. 3A, used to detect the stability of the radius roll, in accordance with embodiments of the present disclosure.
Figure 4A:
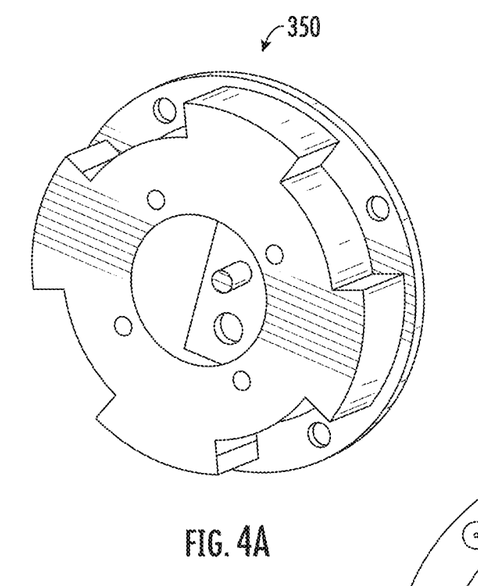
FIG. 4A illustrates a perspective view of a coupling utilized to operatively couple the movement sensor to the radius unit, in accordance with embodiments of the present disclosure.
Figure 4B:
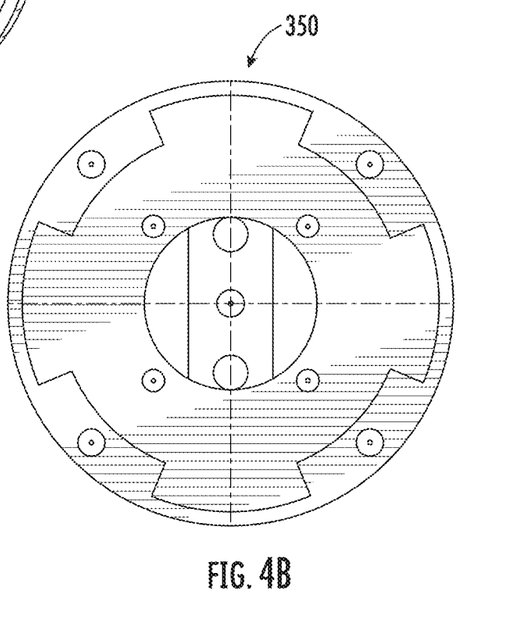
FIG. 4B illustrates an end view of the coupling utilized to operatively couple the movement sensor to the radius unit, in accordance with embodiments of the present disclosure.
Figure 4C:
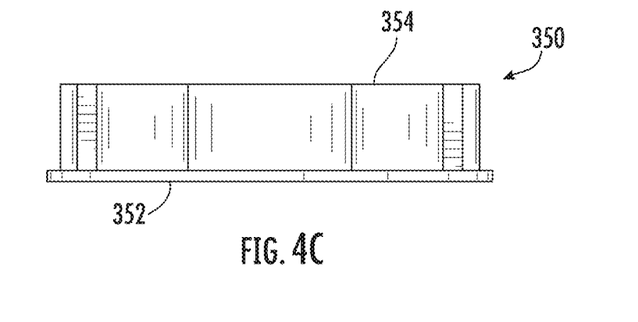
FIG. 4C illustrates a side view of the coupling utilized to operatively couple the movement sensor to the radius unit, in accordance with embodiments of the present disclosure.

Returning to FIG. 1, as described with respect in block 104, the present disclosure captures feedback from the casting stand 200, and in particular from the radius unit 210. The feedback can be captured in a number of different ways. For example, in one embodiment of the invention the feedback is captured through the use of a movement sensor 300 (e.g., a resolver, encoder, tachometer, or the like). In some embodiments, the movement sensor 300 captures the speed of the radius roll 212, such as rotations per a unit of time, or other like speed measurements. In some embodiments, the movement sensor 300 may be a resolver 310. The resolver 310 is illustrated in further detail in FIGS. 3A and 3B. The resolver 310 may be operatively coupled to the radius roller 212 through the use of a coupling 350. One embodiment of the coupling 350 is illustrated in FIGS. 4A through 4C. The coupling 350 may be operatively coupled to the radius roll 212 (e.g., through a radius roll shaft, the side of the radius roll 212, or other feature of the radius roll 212 or radius unit 210) at a first coupling end 352. The coupling 350 may be operatively coupled to the radius unit 210 through the use of one or more fasteners (e.g., bolt, nut, clamp, flange, or the like). In one embodiment, the coupling 350 may be bolted to the side of the radius roll 212 around the shaft of the radius roll 212. The movement sensor 300, such as the resolver 310 (or other movement sensor), may be operatively coupled to the coupling 350 at a second end 354 of the coupling 350. It should be understood that the movement sensor 300 (e.g., resolver 310 or other sensor) and the coupling 350 may be rugged in order to survive and operate as needed in the harsh environment of the casting stand 100 (e.g., the high temperatures, dust, heavy equipment, or the like).

It should be understood that instead of, or in addition to, using a movement sensor 300, other feedback may be captured from the radius unit 210. For example, in some embodiments one or more force sensors (e.g., load cells, strain gauges, or the like) may be utilized in order to capture a load being applied to the radius unit 210. For example, the force sensor may be utilized in order to determine the load, if any, being applied to the radius unit 210 (e.g., to the radius roll 212).

Returning to FIG. 1, block 106 illustrates that the control system monitors the feedback captured from the radius unit 210. For example, the movement sensor 300 (e.g., resolver 310) may capture the speed of the radius roll 212 over time. However, instead of, or in addition to, monitoring the speed captured by the movement sensor 300, the control system may monitor the stability of the radius roll 212. For example, in some embodiments of the invention the control system monitors the change in the speed (or lack of the change in speed) over time and/or the change in speed with respect to other feedback captured and/or monitored from the casting stand 100. As will be described in further detail later, it should be understood that the speed of the radius roll 212 may increase or decrease, but as long as the speed of the upstream rolls and downstream rolls have also increased or decreased, additional stresses may not be introduced to the steel strand.

Block 108 of FIG. 1 illustrates that in some embodiments the system monitors the feedback from one or more of the upstream units 230 (e.g., upstream rollers and/or motors) and/or one or more of downstream units 250 (e.g., downstream rollers and/or motors) located upstream or downstream from the radius unit 210. The upstream rollers 232 may also be referred to as the casting strand pinch rollers, which determine how fast the steel strand leaves the mold that casts the molten steel into the steel strand. Alternatively, the downstream rollers 252 may also be referred to as the withdrawing/straightening rollers, which may pull and/or straighten the steel strand from the vertical direction to the horizontal direction. The upstream rollers 232 and downstream rollers 252 are controlled through the use of the one or more upstream motors 238 and the one or more downstream motors 258 (e.g., direct current (DC) motors, or the like). While the speed of the motors may be controlled, in one embodiment of the invention, the motors may be controlled by controlling the current to the motors. It should be understood that typically, the one or more upstream and downstream rollers may share the amount of load required to move the steel strand. However, the amount of the load shared depends on the size of the motors. In some bending casting stands the downstream motors 258 may be larger than the upstream motors 238, due in part to the fact that the upstream motors 238 are aided by gravity pulling on the steel strand located in the vertical orientation, while the downstream motors are not aided by gravity in moving the steel strand in the horizontal orientation. As such, in typical bending casting stands, the downstream motors 258 share more of the load in the casting speed of the steel strand. As such, in typical load sharing, the amount of load shared by the one or more upstream motors 238 powering the one or more upstream rollers 232 when compared to the one or more downstream motors 258 (e.g., withdrawing and straightening motors) powering the one or more downstream rollers 252 may be fixed at a percentage of 75%. In other embodiments of the invention the load sharing percentage may be fixed at any percentage described herein, such as but not limited to 50, 55, 60, 65, 70, 75, 80, 85, 95, 100, 105, 110, 120, 130, 140, 150, or the like. In the present disclosure, in some embodiments the load share between the upstream motors and the downstream motors may be set between various ranges, depending on the power of the motors 238, 258. In some embodiments, the range may be 55 to 85 percent, 60 to 90 percent, 65 to 95 percent, 50 to 90 percent, 60 to 80 percent, 65 to 85 percent, 70 to 80 percent, or the like. In some embodiments, the range of the load sharing may be anywhere between, overlapping, or outside of any of the fixed or ranged numbers described herein.

As illustrated by block 110 in FIG. 1, the control system takes the feedback monitored in the casting stand 200 and determines the relationship between the feedback from the one or more radius units 210, the one or more upstream units 230, and/or the one or more downstream units 250. For example, the control system identifies the stability of the radius roll 212 compared to the cast speed of the steel strand, which is a function of the one or more upstream units 230 and/or the downstream units 250. For example, the control system may determine that the radius roll 212 is stable, that is, the speed of the radius roll 212 has not changed for a period of time. The trigger period of time for stability may be 5, 6, 7, 8, 9, 10, 11, 12, 13, 14, 15, 16, 17, 18, 19, 20, 21, 22, 23, 24, 25, 30, 35, 40, 45, 50, 60, 70, 80, 90, 110 seconds, or may be 2, 3, 4, or 5 or other like minutes. Alternatively, the control system may determine that the stability of the radius roll 212 is decreasing (e.g., unstable such as changing speed over a period of time, decreasing speed over a period of time, or the like) and/or the speed of the radius roll 212 is less than the casting speed. It should be understood that the trigger period of time for determining instability may be 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 60, 70, 80, 90, 110 seconds, or may be 2, 3, 4, or 5 or other like minutes. It should be understood that the trigger period of time for determining either the stability or instability may range within, outside, or overlap any of the trigger period of times listed herein. In some embodiments of the invention, it should be understood that the trigger period of time for determining instability is less than the trigger period of time for determining stability because between the two it may be preferred for the steel strand to be allowed to sag as opposed to pulling the strand taut.

As illustrated by blocks 112 and 114 in FIG. 1, the control system will adjust the casting speed in response to the stability and/or speed of the radius roll 212. As illustrated by block 112 in FIG. 1, if the radius roll 212 is stable for too long it may mean that the steel strand has the desired radius or that the steel strand is resting too much on the radius roll 212 (e.g., sagging). As such, in response, the percentage of load shared of the casting speed is increased in order to pull the slab away from the radius roll 212. The percentage of the load shared may be increased by increasing the force of the downstream rollers 252 and/or decreasing the force of the upstream rollers 232 (e.g., by increasing the current to the downstream motors 258 and/or decreasing the current to the upstream motors 238). By changing the force of the upstream and/or downstream rollers the force at which the steel strand exits the upstream rolls is decreased and/or the force at which the steel strand is pulled by the downstream rolls is increased. In response, the steel strand will pull away from the radius roll 212 (e.g., it may still touch, but the force exerted on the radius roll 212 may decrease). In response, the stability of the radius roll 212 may stay the same (e.g., if the steel strand is still touching the radius roll), or the stability of the radius roll 212 will decrease (e.g., if the steel strand is pulled off of the radius roll).

Alternatively, as illustrated by block 114 in FIG. 1, if the speed of the radius roll 212 is less than the casting speed or if the stability of radius roll 212 decreases (e.g., speed of the radius roll 212 is fluctuating meaning that the steel strand varies between contacting and coming off the radius roll 212) then the percentage of the load share is decreased in order to relax the radius of the steel strand such that the speed of the radius roll 212 becomes stable. The percentage of the load share may be decreased by decreasing the pull force of the downstream rollers 252 and/or increasing the force of the upstream rollers 232 (e.g., by decreasing the current to the downstream motors and/or increasing the current to the upstream rollers). In response, the stability of the radius roll 212 may increase and become stable (e.g., if the steel strand is now touching the radius roll).

In determining whether or not to increase and/or decrease the upstream rollers 232 and/or increase and/or decrease the downstream rollers 252, the control system may look at the cast speed of the steel strand and/or the speed of the individual upstream rollers and/or downstream rollers.

Block 116 of FIG. 1 illustrates that the control system continues to monitor the stability of the radius roll 212 and adjusts the upstream and/or downstream units 230, 250 by adjusting the percentage of the load shared between the upstream and/or downstream units 230, 250, and/or other parameters of the steel making process. As such, when a modification is made to the load share, the control system may continue to monitor the stability and/or the speeds of the rollers of the units in order to determine if a change in load share achieved the desired results, if additional load share changes are required, and/or if the load share changes need to be reversed. For example, if the radius roll 212 was stable, and in response the load share was increased, but the stability of the radius roll 212 didn't change, then the load share may be further increased. Alternatively, if the radius roll 212 was stable, and in response the load share was increased, but the stability of the radius roll 212 became unstable, in response the load share may be decreased. In other examples, if the radius roll 212 was unstable, and in response the load share was decreased, but the stability of the radius roll 212 remained unstable, then the load share may be further decreased. Alternatively, if the radius roll 212 was unstable, and in response the load share was decreased, and the stability of the radius roll 212 became stable, in response the load share may be increased (e.g., slightly increased until a slight instability is identified).

As previously discussed herein, while the control system may utilize a stability determination (e.g., change in speed over a period of time) of the radius roll 212 in order to control the load share, it should be understood that alternatively, or in addition, the speed of the radius roll 212 may be monitored, and/or the speed of the upstream rolls 232 and/or the downstream rolls 252 may be changed in response to monitoring the speed of the radius roll 212. For example, if the speed of the radius roll 212 is increased or decreased, the speed of the upstream rolls 232 and/or the downstream rolls 252 may be increased or decreased accordingly.

Moreover, it should be further understood that instead of, or in addition to utilizing one or more movement sensors 300, the control system may capture and monitor the force applied to the radius unit 210 from the steel strand. For example, as previously discussed the force sensor (e.g., a load cells, strain gauge, or the like) may be operatively coupled to one or more of the radius units 210 in order to determine the force that steel strand is applying to the radius unit 210 (e.g., the radius roll 212).

As such, it should be understood that a combination of stability, speed, and/or force feedback from the radius unit may be utilized in order to determine how to control the load share and/or casting speed of the upstream and/or downstream units 230, 250. For example, in some embodiments the radius roll 212 may be determined to be stable (e.g., the speed is unchanged for a period of time). However, it should be understood that the stability of the radius roll 212 may remain unchanged in two different instances, one being if radius of the steel strand remains constant and is touching the radius roll 212 as desired, and secondly, if the steel strand continues to sag against the radius roll 212 (e.g., the radius roll will continue to turn at the same speed even as the steel strand continues to sag and apply more force to the radius roll). As such, in addition to monitoring the stability of the radius roll 212, the force applied to the radius roll 212 is also monitored using a force sensor. The force sensor may be used to determine if the force applied to the radius roll 212 is unchanged (e.g., the steel strand is at the desired radius), or the force is increasing (e.g., the steel strand is sagging). In response to both the stability and force measurements load share may remain unchanged, or the load share may be increased to lift the sagging steel strand.

Additionally, or alternatively, the speed of the one or more upstream rolls 232 and/or the one or more downstream rolls 252 may be monitored. For example, if the radius roll 212 is stable, and a ratio of the speed of the upstream rolls 232 to downstream rolls 252 remains unchanged, then the steel strand may be at the desired radius. Alternatively, if the radius roll 212 is stable, and a ratio of the speed of the upstream rolls 232 to the downstream rolls 252 is increasing then the steel strand may be sagging, and the load share may be increased to lift the sagging steel strand.

It should be understood that one or more of the stability, speed, and/or force of the radius unit 210, the upstream unit 230, and/or the downstream unit 250 in the control stand 200, may be monitored and/or adjusted to reduce the stresses on the steel strand that occur during the casting process.

Figure 5:
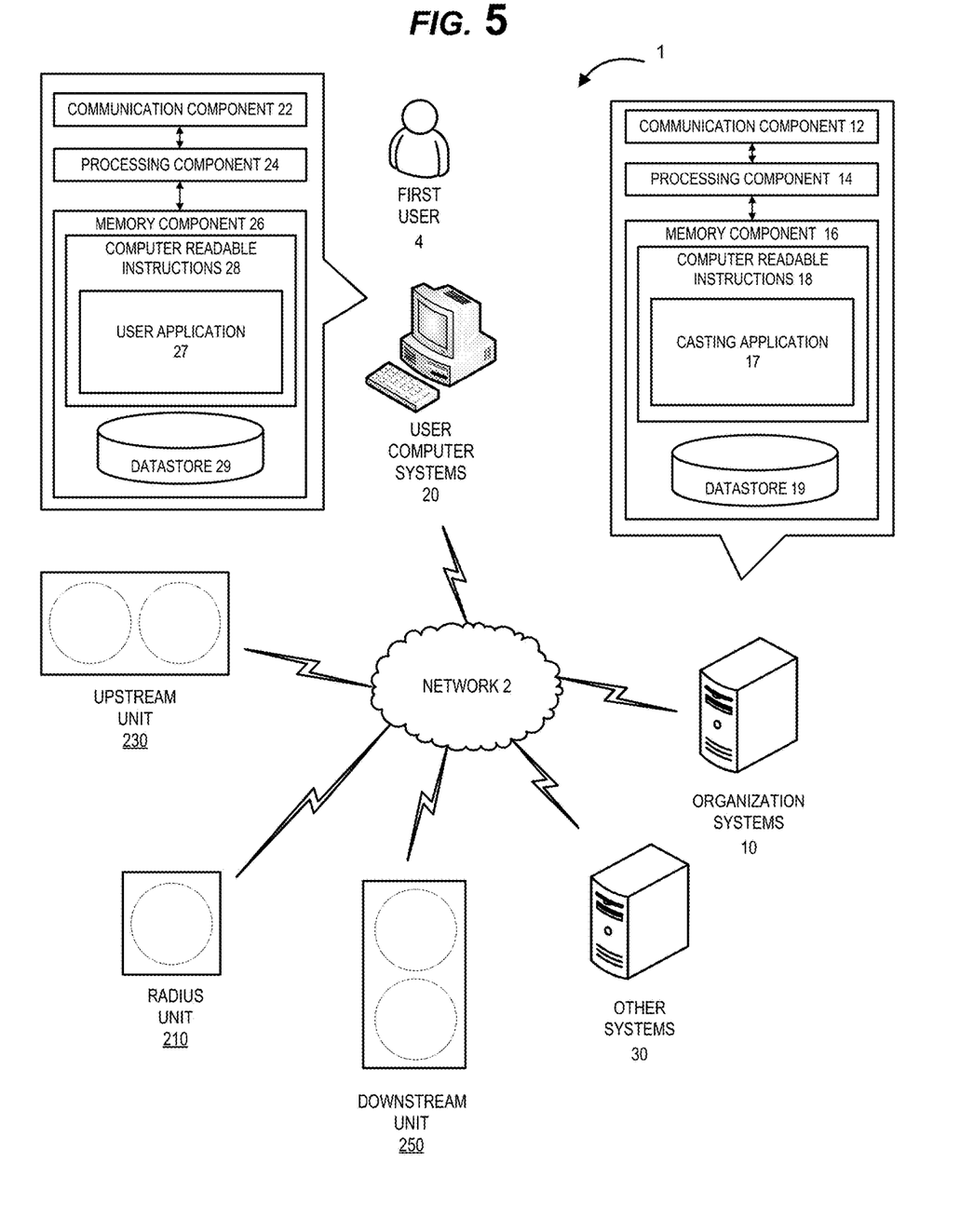
FIG. 5 illustrates a control system utilized to control the casting process, in accordance with embodiments of the present disclosure.

FIG. 5 illustrates a casting control system environment 1, in accordance with embodiments of the invention. As illustrated in FIG. 5, one or more organization systems 10 are operatively coupled, via a network 2, to one or more user computer systems 20, one or more upstream units 230 (e.g., feedback from the upstream motors, rollers, or devices attached thereto), one or more radius units 210 (e.g., feedback form the roller, movement sensor 300, force sensor, or other device), and/or one or more downstream units 250 (e.g., feedback from the motors, rollers, or devices attached thereto). In this way, the user 4 (e.g., one or more associates, employees, agents, contractors, sub-contractors, third-party representatives, customers, or the like), through a user application 27, may access a casting application 17 of the organization systems 10 in order to view the casting process and make any changes needed. The user application 27 may be an application that can access the casting application 17 (e.g., web browser or dedicated application) or may be a portion of the casting application 17 that is located locally on the user computer systems 20. It should be understood that in some embodiments instead of being remotely located on one or more organization systems 10, the entire casting application 17 may be located on one or more of the user computer systems 20.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 5, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the one or more upstream units 230, the one or more radius units 210, and/or the one or more downstream units 250. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 5, the organization systems 10 comprise computer-readable instructions 18 stored in the memory component 16, which in one embodiment includes the computer-readable instructions 18 of the casting application 17. In some embodiments, the one or more memory components 16 include one or more data stores 19 for storing data related to the organization systems 10, including, but not limited to, data created, accessed, captured, and/or used by the casting application 17 to control the casting stand and various units therein, as previously described herein.

As illustrated in FIG. 5, users 4 may access the casting application 17, or other applications, through a user computer system 20. The user computer system 20 may be a desktop, mobile device (e.g., laptop, smartphone device, PDA, tablet, or other mobile device), control station, or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the organization systems 10, the one or more upstream units 30, the one or more radius units 210, and/or the one or more downstream units 250, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 5, the user computer systems 20 may have computer-readable instructions 28 stored in the one or more memory components 26, which in one embodiment includes the computer-readable instructions 28 for user applications 27, such as a dedicated applications (e.g., apps, applet, or the like), portions of dedicated applications, a web browser or other apps that allow the user 4 to take various actions, including allowing the user 4 to access applications located on other systems, or the like, such as the casting application 17.

The one or more upstream units 230, the one or more radius units 210, and/or the one or more downstream units 250 were previously described herein. However, it should be generally understood that these units have components similar to the components described herein with respect to the system (e.g., processors, wired or wireless communication, or the like) that allows the units to send and/or receive information (e.g., control signals, feedback, or the like) that allows for the monitoring and/or control of the casting process 100.

Moreover, as illustrated in FIG. 5, the other systems 30 may be operatively coupled to the organization systems 10, the user computer systems 20, and/or the units through the network 2. The other systems 30 have components the same as or similar to the components described with respect to the organization systems 10 and/or the user computer systems 20 (e.g., one or more communication components, one or more processing components, and one or more memory devices with computer-readable instructions of one or more applications, one or more datastores, or the like). Thus, the other systems 30 communicate with the organization systems 10, the user computer systems 20, the units, and/or each other in same or similar way as previously described with respect to the organization systems 10 and the user computer systems 20. The other systems 30 may be third-party systems and/or intermediary systems that allow for the communication between the organization systems 10, the user computer systems 20, and/or the units 230, 210, 250. It should be understood that any of the systems or units described herein may be one or more systems or one or more units.

In some embodiments of the invention, one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein.

It should be understood, that the systems, devices, and components described in herein may be configured to establish an electronic communications link with each other in order to accomplish the steps of the processes described herein. The link may be an internal link within the same systems or an external link with the other systems of other parties. The information provided by the systems may be made continuously available, however, continuously available does not necessarily mean that the sources actually continuously generate data, but that a sources are continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with each individual system. There are many ways in which information is converted within the system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will be understood that, where possible, any of the advantages, features, functions, devices, and/or operational aspects of any of the embodiments of the present disclosure described and/or contemplated herein may be included in any of the other embodiments of the present disclosure described and/or contemplated herein, and/or vice versa.

Where possible, any terms expressed in the singular form herein are meant to also include the plural form and/or vice versa, unless explicitly stated otherwise. Accordingly, the terms "a" and/or "an" shall mean "one or more." As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Moreover, it should be understood that "operatively coupled," when used herein, means that the components may be formed integrally with each other, or may be formed separately and coupled together. Furthermore, "operatively coupled" means that the components may be coupled directly to each other, or to each other with one or more components located between the components that are operatively coupled together. Furthermore, "operatively coupled"

may mean that the components are detachable from each other, or that they are permanently coupled together.

Furthermore, certain terminology is used herein for convenience only and is not to be taken as a limiting, unless such terminology is specifically described herein for specific embodiments. Indeed, the components may be oriented in any direction and the terminology, therefore, should be understood as encompassing such variations unless specified otherwise. The terminology includes the words specifically mentioned herein, derivatives thereof and words of similar import. For example, words such as "vertical" and "horizontal", are used to describe the orientation of the steel strand. It should be understood that when using the terminology "vertical" this could mean perpendicular (e.g., 90 degrees with respect to the ground), substantially perpendicular (e.g., within +/−10 degrees from 90 degrees with respect to the ground), generally perpendicular (e.g., +/−25 degrees from 90 degrees with respect to the ground), or the like. Furthermore, when using the terminology "horizontal" this could mean parallel (e.g., 0 degrees with respect to the ground), substantially parallel (e.g., +/−10 degrees from 0 degrees with respect to the ground), generally parallel (e.g., +/−25 degrees from 0 degrees with respect to the ground), or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method of controlling a casting process, the method comprising:
   receiving feedback from a radius unit within a casting stand wherein receiving the feedback from the radius unit comprises receiving an indicator of movement of a radius roll of the radius unit;
   monitoring the feedback from the radius unit wherein the monitoring of the feedback from the radius roll comprises identifying stability of the radius roll; and
   adjusting an upstream unit or a downstream unit based on the monitoring of the feedback received from the radius unit, wherein the radius unit is located between the upstream unit and the downstream unit, and wherein adjusting the upstream unit or the downstream unit comprises:
      identifying that the stability of the radius roll remains unchanged for a first time period, and increasing a load share of the downstream unit compared to the upstream unit; or
      identifying that the stability of the radius roll changes for a second time period or a speed of the radius roll is less than a casting speed, and decreasing the load share of the downstream unit compared to the upstream unit.

2. The method of claim 1, wherein the stability is a change in speed of the radius roll.

3. The method of claim 1, wherein the stability of the radius roll remains unchanged for the first time period and the load share of the downstream unit compared to the upstream unit is increased.

4. The method of claim 3, wherein increasing the load share comprises increasing a downstream current to a downstream motor of the downstream unit or decreasing an upstream current to an upstream motor of the upstream unit.

5. The method of claim 1, wherein the stability of the radius roll changes for the second time period or the speed of the radius roll is less than the casting speed and the load share of the downstream unit compared to the upstream unit is decreased.

6. The method of claim 5, wherein decreasing the load share comprises decreasing a downstream current to a downstream motor of the downstream unit or increasing an upstream current to an upstream motor of the upstream unit.

7. The method of claim 1, wherein the feedback received from the radius unit is received through a movement sensor operatively coupled to the radius roll of the radius unit that measures a movement of the radius roll.

8. The method of claim 1, wherein the receiving, the monitoring, and the adjusting occur through a control system, wherein the control system comprises:
   one or more memory devices having computer readable program code stored thereon; and
   one or more processing devices operatively coupled to the one or more memory devices, wherein the one or more processing devices are configured to execute the computer readable program code to perform the receiving, the monitoring, and the adjusting.

9. The method of claim 1, wherein the first time period and the second time period are the same amount of time.

10. A control system for a casting stand, the control system comprising:
   one or more memory devices having computer readable program code stored thereon; and
   one or more processing devices operatively coupled to the one or more memory devices, wherein the one or more processing devices are configured to execute the computer readable program code to:
      receive feedback from a radius unit within the casting stand, wherein receiving the feedback from the radius unit comprises receiving an indicator of movement of a radius roll of the radius unit;
      monitor the feedback from the radius unit, wherein the monitoring of the feedback from the radius roll comprises identifying stability of the radius roll; and
      adjust an upstream unit or a downstream unit based on the monitoring of the feedback received from the radius unit, wherein the radius unit is located between the upstream unit and the downstream unit, and wherein adjusting the upstream unit or the downstream unit comprises:
         identifying that the stability of the radius roll remains unchanged for a first time period, and increasing a load share of the downstream unit compared to the upstream unit: or
         identifying that the stability of the radius roll changes for a second time period or a speed of the radius roll is less than a casting speed, and decreasing the load share of the downstream unit compared to the upstream unit.

11. The control system of claim 10, wherein the stability is a change in speed of the radius roll.

12. The control system of claim 10, wherein the stability of the radius roll remains unchanged for the first time period and the load share of the downstream unit compared to the upstream unit is increased.

13. The control system of claim 12, wherein increasing the load share comprises increasing a downstream current to a downstream motor of the downstream unit or decreasing an upstream current to an upstream motor of the upstream unit.

14. The control system of claim 10, wherein the stability of the radius roll changes for the first time period or the speed of the radius roll is less than the casting speed and the load share of the downstream unit compared to the upstream unit is decreased.

15. The control system of claim 14, wherein decreasing the load share comprises decreasing a downstream current to a downstream motor of the downstream unit or increasing an upstream current to an upstream motor of the upstream unit.

16. A casting system, the system comprising:
an upstream unit;
a downstream unit;
a radius unit comprising a radius roll and a movement sensor, wherein the radius unit is located between the upstream unit and the downstream unit; and
a control system operatively coupled to the upstream unit, the downstream unit, and the radius unit;
wherein the control system receives feedback from the movement sensor of the radius unit related to an indicator of movement of the radius roll of the radius unit, monitors the feedback from the radius unit by identifying stability of the radius roll, and adjusts the upstream unit or the downstream unit based on the monitoring of the feedback received from the radius unit, and wherein adjusting the upstream unit or the downstream unit comprises:
identifying that the stability of the radius roll remains unchanged for a first time period, and increasing a load share of the downstream unit compared to the upstream unit; or
identifying that the stability of the radius roll changes for a second time period or a speed of the radius roll is less than a casting speed, and decreasing the load share of the downstream unit compared to the upstream unit.

17. The casting system of claim 16, wherein the stability is a change in speed of the radius roll for the first time period, and the load share of the downstream unit compared to the upstream unit is increased.

18. The casting system of claim 17, wherein increasing the load share comprises increasing a downstream current to a downstream motor of the downstream unit or decreasing an upstream current to an upstream motor of the upstream unit.

19. The casting system of claim 16, wherein the stability is a change in speed of the radius roll changes for the first time period or the speed of the radius roll is less than the casting speed, and the load share of the downstream unit compared to the upstream unit is decreased.

20. The casting system of claim 19, wherein decreasing the load share comprises decreasing a downstream current to a downstream motor of the downstream unit or increasing an upstream current to an upstream motor of the upstream unit.

* * * * *